United States Patent
Lerner et al.

(10) Patent No.: US 9,184,971 B2
(45) Date of Patent: Nov. 10, 2015

(54) APPARATUS FOR AND METHOD OF ROBUST PACKET DETECTION AND FREQUENCY OFFSET ESTIMATION

(75) Inventors: Gregory Lerner, Petach Tikva (IL); Nir Tal, Haifa (IL); Dan Wolberg, Moshav Yanuv (IL); Manoneet Singh, Santa Clara, CA (US); Yehuda Azenkot, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2454 days.

(21) Appl. No.: 11/739,094

(22) Filed: Apr. 23, 2007

(65) Prior Publication Data

US 2007/0248195 A1 Oct. 25, 2007

Related U.S. Application Data

(60) Provisional application No. 60/745,589, filed on Apr. 25, 2006.

(51) Int. Cl.
*H04L 27/00* (2006.01)
*H04L 27/26* (2006.01)
*H04L 7/04* (2006.01)
*H04L 7/08* (2006.01)

(52) U.S. Cl.
CPC ............ *H04L 27/2656* (2013.01); *H04L 7/042* (2013.01); *H04L 27/2657* (2013.01); *H04L 27/2679* (2013.01); *H04L 7/08* (2013.01); *H04L 2027/0046* (2013.01); *H04L 2027/0065* (2013.01)

(58) Field of Classification Search
CPC ................................................. H04L 27/2656

USPC .................... 375/359, 343; 455/130; 379/377
See application file for complete search history.

(56) References Cited

U.S. PATENT DOCUMENTS

| | | | | |
|---|---|---|---|---|
| 5,822,424 A * | 10/1998 | Kim et al. | ...................... | 379/377 |
| 6,487,260 B1 * | 11/2002 | Schweickert et al. | ........ | 375/343 |
| 7,424,277 B2 * | 9/2008 | Finkelstein et al. | .......... | 455/130 |
| 2004/0170237 A1 * | 9/2004 | Chadha et al. | ................ | 375/343 |
| 2008/0304607 A1 * | 12/2008 | Birru | ............................. | 375/359 |

OTHER PUBLICATIONS

Osborne et al.; Coherent and Noncoherent Detection of CPFSK; 1974; pp. 1023-1036.*
T. M. Schmidl and D.C. Cox, "Robust Frequency and Timing Synchronization for OFDM," IEEE Trans. on Comm., vol. 45, No. 12, Dec. 1997, pp. 1613-1621.

* cited by examiner

*Primary Examiner* — Tanmay Shah
(74) *Attorney, Agent, or Firm* — Ronald O. Neerings; Frank D. Cimino (57) ABSTRACT

A novel and useful apparatus for and method of packet detection and carrier frequency offset estimation. The packet detection mechanism is robust to channels and sustains reasonable miss-detect (and false alarm) rates at low SNR values. The mechanism uses a modified combined cross correlation and delay and correlate scheme. A delay and correlate scheme is used in order to handle the effects of multipath while swapping integration and multiplication to increase cross-correlation factors resulting in improved sensitivity in low SNR conditions. Correlation is divided into multiple chains to generate a plurality of partial correlations to observe short patterns in the spread sequence resulting in improved performance in long multipath channels.

21 Claims, 10 Drawing Sheets

APPARATUS FOR AND METHOD OF ROBUST PACKET DETECTION AND FREQUENCY OFFSET ESTIMATION

REFERENCE TO PRIORITY APPLICATION

This application claims priority to U.S. Provisional Application Ser. No. 60/745,589, filed Apr. 25, 2006, entitled "UWB Packet Detection and Coarse Frequency Carrier Offset Estimation Design Review", incorporated herein by reference in its entirety.

FIELD OF THE INVENTION

The present invention relates to the field of data communications and more particularly relates to an apparatus for and method of robust packet detection and frequency offset estimation for use in a digital receiver.

BACKGROUND OF THE INVENTION

The use of packet data transmission and reception is well known in the art. Digital data in the form of a bit stream is assembled into packets, modulated using a modulation scheme and transmitted over a medium (i.e. channel). At the other end of the communications channel, a receiver tries to receive the packet and demodulate the signal back into the original bit stream.

Figure 1:
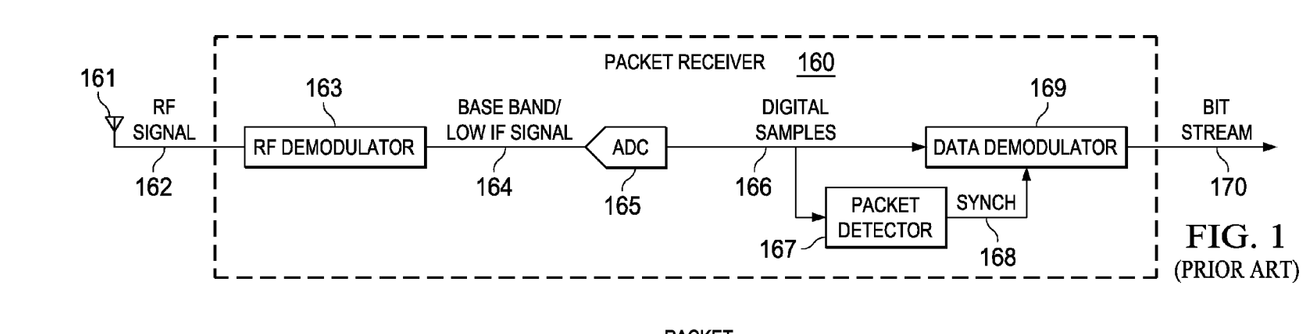
FIG. 1 is a high level block diagram of a prior art wireless receiver for packet transmission schemes such as WLAN 802.11a/g/n or MBOA-UWB.

A high level block diagram of a prior art wireless receiver suitable for packet transmission schemes such as WLAN 802.11a/g/n or MBOA-UWB is shown in FIG. 1. The packet receiver, generally referenced 160, comprises an antenna 161, RF demodulator 163, analog to digital converter (ADC) 165, data demodulator 169 and packet detector 167.

In operation, the RF signal 162 is received (picked up) by the antenna 161 and then demodulated by an RF demodulator 163 into a base band or intermediate frequency (IF) signal 164. An analog to digital converter (ADC) 165 translates the analog signal into digital samples 166. The samples are then input to a packet detector 167, which functions to detect when a packet starts and in response provides a synchronization or sync signal 168 to a data demodulator 169. The output of the data demodulator (i.e. modem receiver) 169 translates the digital samples 166 along with the synchronization signal 168 into an output bit stream 170.

Note that the packet receiver 160 highlights the importance of the packet detector 167. The detector 167, however, is an inherently weak link in this scheme because accurate packet detection (which is usually measured by detection and false alarm probabilities) is a necessary but insufficient condition for packet detection. Therefore, if a packet is not detected, the data demodulator 169 will not be able to correctly demodulate the digital samples 166 and generate the packet in output bit stream 170.

Since the wireless medium along with other media types (e.g., cable transmission, optical fiber transmission, etc.) usually consists of noise and other impairments added to the desired signal, it is essential that the packet detector 167 be as robust as possible to the various impairments and be able to accurately provide the sync signal 168 at well below the detection conditions of the data demodulator 169 in order that it does not limit the receiver performance.

Figure 2:
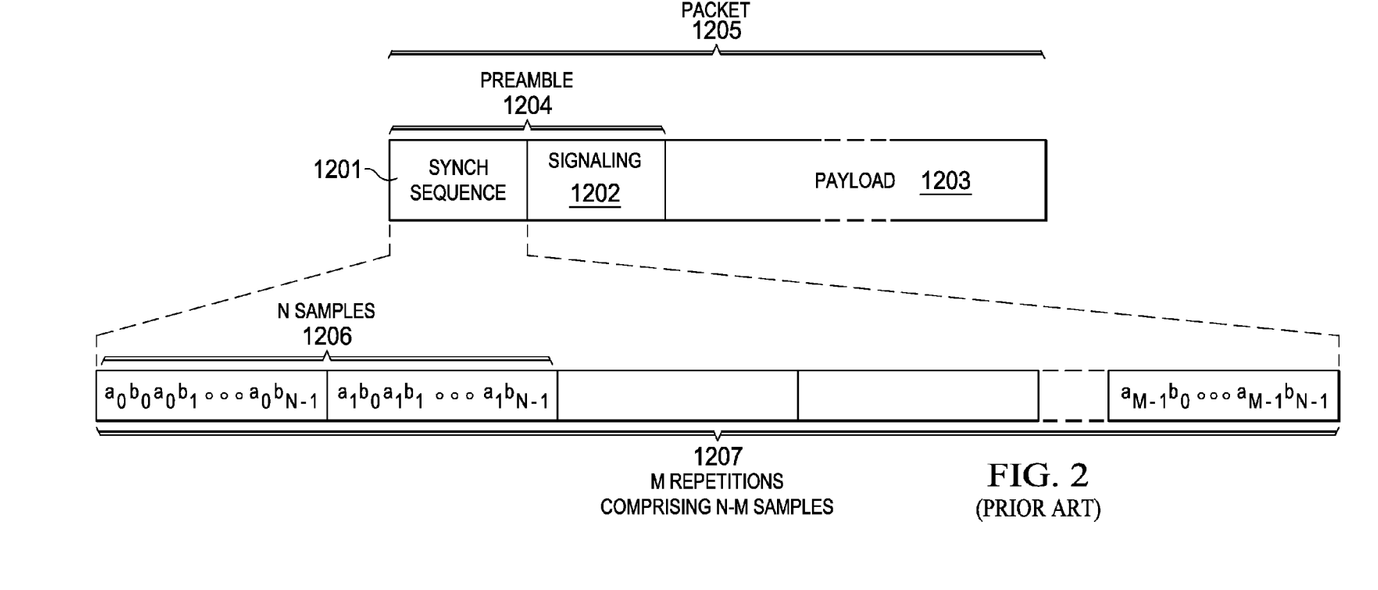
FIG. 2 is a diagram illustrating a typical prior art packet structure and associated synchronization sequence internal structure.

A diagram illustrating a typical prior art packet structure and associated synchronization sequence internal structure is shown in FIG. 2. A packet, generally referenced 1205, comprises modulated signals containing a sync sequence field 1201, signaling sequence field 1202 providing information about the packet length, type, priority, etc. and the actual data field (i.e. payload) 1203. The sync sequence is shown expanded into a plurality of sample repetitions. The sync sequence typically comprises periodic or spread spectrum signals comprising M repetitions 1207 of N samples 1206.

For clarity sake we denote the sync sequence 1201 samples as follows. Let $b_0, b_1, \ldots, b_{N-1}$ denote the basic sequence (i.e. spreading sequence) multiplied by spread sequence $a_0, a_1, \ldots, a_{M-1}$. The sync sequence 1201 can then be denoted by: $a_0 b_0, a_0 b_1, \ldots a_0 b_{N-1}, a_1 b_0, a_1 b_1, \ldots, a_1 b_{N-1}, \ldots, a_{M-1} b_0, a_{M-1} b_1, \ldots, a_{M-1} b_{N-1}$. We also denote $c_n = a_{\lfloor n/M \rfloor} b_{n \bmod N}$ as the $n^{th}$ sample in the sequence ($n \in \{0 \ldots (N-1)(M-1)\}$). For brevity we denote K=NM as the length of the entire synchronization sequence 1201.

Two current wireless standards that match this pattern of packet detection are the 802.11a/g standard wherein M=10, N=16 and $a_n$=1 and the Multiband OFDM Alliance (MBOA) Ultra Wideband (UWB) standard wherein M=16 and N=8.

Packet detection of an UWB OFDM signal is based on detection of a sequence of preamble symbols. A preamble sequence may be approximated by spreading a 16-bit sequence ('a' sequence) by n 8-bit sequence ('b' sequence). High coding gain of UWB implies a high sensitivity requirement (i.e. below 0 dB SNR), while wide bandwidth and wireless channels implies immunity to the multipath conditions. In addition, in this case symbol based detection is necessary due to possible frequency offset and to lower required circuit area due to avoiding the use of large area memory and minimization of computations.

The 802.11a/g standards operates in 2.4 GHz and 5 GHz bands, respectively, and use 52-subcarrier orthogonal frequency-division multiplexing (OFDM) with a maximum data rate of 54 Mbps. Out of the 52 OFDM subcarriers, 48 are for data and 4 are pilot subcarriers. Each of these subcarriers can have the following modulations: BPSK, QPSK, 16-QAM or 64-QAM. Each of the subcarriers can be represented as a complex number wherein the actual generation and decoding of orthogonal components is performed during baseband processing typically using DSP or other processors which is then upconverted to the RF frequency at the transmitter. The time domain signal is generated by taking an Inverse Fast Fourier transform (IFFT) of the baseband transmit signal. In the receive direction, the receiver downconverts the received samples and performs an FFT to retrieve the original coefficients.

A traditional UWB transmitter works by transmitting pulses across a very wide spectrum of frequency (e.g., typically over a bandwidth of several GHz). At the receiver, the pulses are translated into data by detecting a known pulse sequence (i.e. sync sequence) sent by the transmitter. Modem UWB systems use modulation techniques such as Orthogonal Frequency Division Multiplexing (OFDM) to occupy such wide bandwidths. MultiBand OFDM is capable of dynamically turning off subbands and individual OFDM tones. This provides for good coexistence with narrowband systems such as 802.11a, adaptation to different regulatory environments, future scalability and backward compatibility.

In MultiBand OFDM, the available spectrum of 7.5 GHz is divided into several 528 MHz frequency bands. This allows the selective implementation of bands at certain frequency ranges while leaving other parts of the spectrum unused. The MBOA proposal provides for five logical channels wherein Channel 1, which contains the first three bands, is mandatory for all UWB devices and radios.

OFDM is operative to modulate the information transmitted on each band. OFDM distributes the data over a large number of carriers spaced apart at precise frequencies. This spacing provides the orthogonality, which prevents the demodulators from seeing frequencies other than their own. The benefits of OFDM are high-spectral efficiency, resiliency to RF interference and lower multipath distortion.

Figure 3:
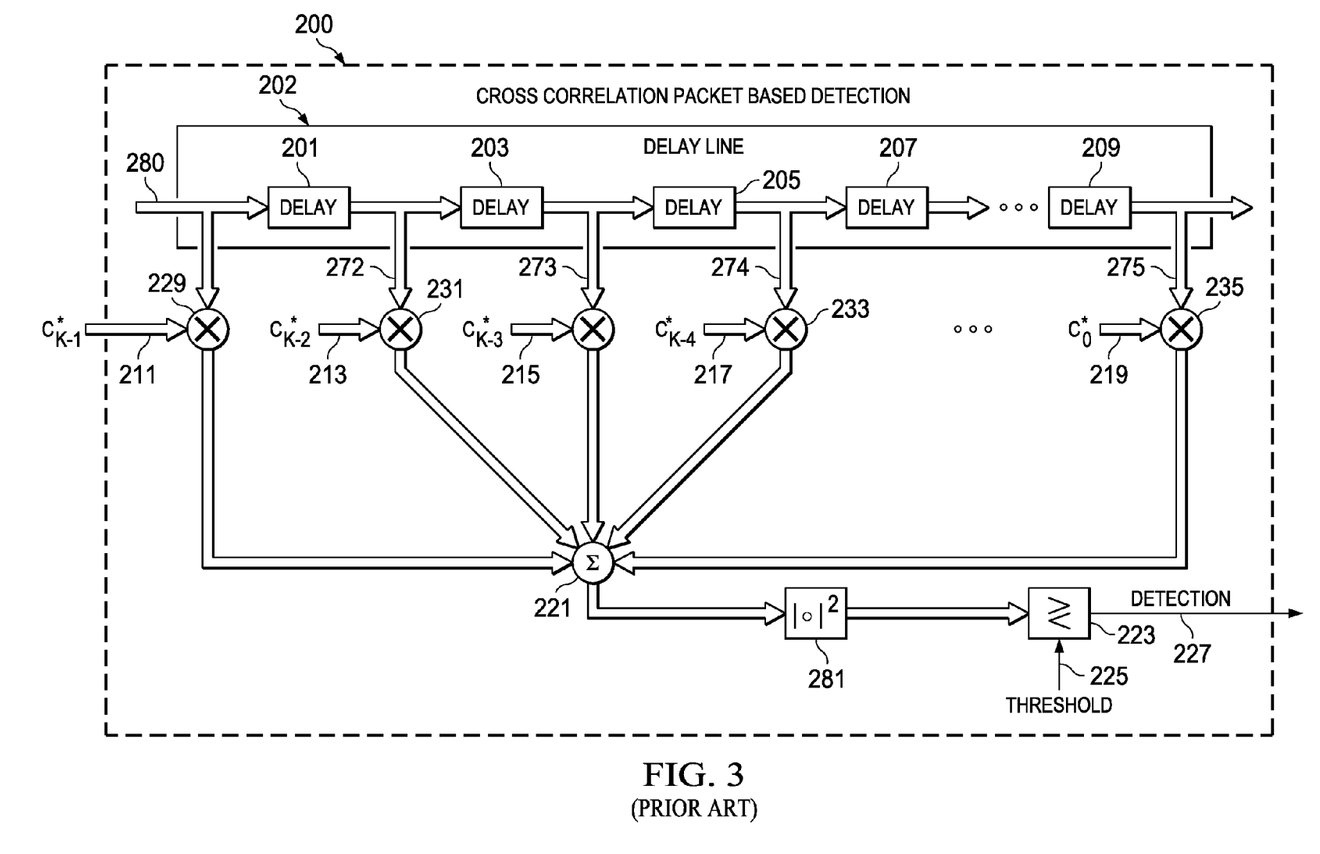
FIG. 3 is a block diagram illustrating a prior art technique for detecting synchronization sequences using cross correlation.
Figure 4:
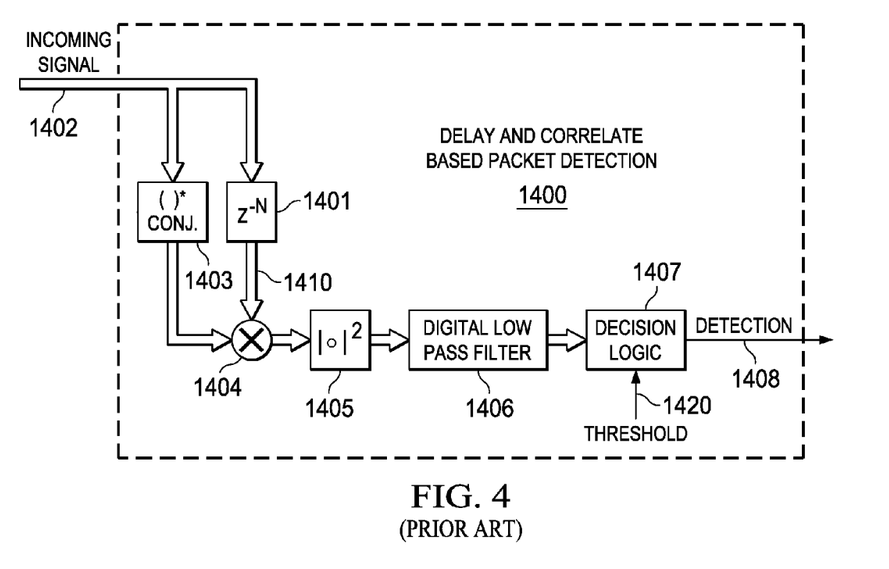
FIG. 4 is a block diagram illustrating a prior art method for detecting a synchronization sequence using a delay and correlate scheme.

Two well known prior art packet detector schemes are shown in FIGS. 3 and 4. A block diagram illustrating a prior art technique for detecting synchronization sequences using cross correlation is shown in FIG. 3. The cross correlation based packet detector, generally referenced 200, comprises a delay line 202 comprising a plurality of delay elements 201, 203, 205, 207, 209, a plurality of multipliers 229, 231, 233, 235, summer 221, absolute value squared 281 and decision logic 223.

In operation, the incoming signal 280 undergoes a delay via delay line 202. The delayed signal samples are multiplied using a plurality of multipliers 229, 231, 233, 235 with the flipped conjugated synchronization sequence samples $c_{K-1}{}^*$, $c_{K-2}{}^*, \ldots, c_1{}^*, c_0{}^*$ 211, 213, 215, 219. The product results of the multiplications are summed together via summer 221. The total correlation result undergoes absolute value 281 and is compared against a threshold 225 using decision block 223 (e.g., a comparator). If the absolute value correlation value goes above threshold 225 the detection signal 227 becomes active indicating detection of a packet. This method is equivalent in signal processing to a matched filter achieving the best signal to noise ratio under an Additive White Gaussian Noise (AWGN) regime.

A major drawback of the prior art cross correlation scheme is that if the signal has undergone a linear multipath (frequency selective) channel (which is almost always the case in wireless and wire line transmission) then the correlation peaks become distorted and the threshold may sometimes never be crossed resulting in a high miss-detection probability (i.e. false-negatives). Lowering the threshold would result in a corresponding increase in the probability of false alarm (i.e. false-positives), just as problematic. Therefore, this makes this prior art cross correlation detection scheme is not very robust to channels.

Yet another major drawback of this prior art scheme is its lack of tolerance to carrier frequency offset. Since the local oscillator (LO) frequency generation mechanism at the transmitter and receiver are unsynchronized, the resultant signal seen by the receiver at the ADC input is frequency shifted with respect to the ideal IF frequency. This causes the delayed signal samples 280, 272, 273 and 275 to accumulate a phase rotation such that even without the presence of noise or multipath fading there would be a different phase for all correlation results summed via summer 221. This non-coherency causes the absolute value of the correlation peak to drop, thus further degrading the performance of this detector.

A block diagram illustrating a prior art method for detecting a synchronization sequence using a delay and correlate scheme is shown in FIG. 4. The delay and correlate based packet detector circuit, generally referenced 1400, comprises a delay 1401, complex conjugate block 1403, multiplier 1404, absolute value block 1405, low pass filter 1406 and decision logic 1407.

In operation, the incoming signal 1402 undergoes a delay by N using delay circuitry 1401. The original incoming signal 1402 is conjugated and then multiplied with the delayed signal 1410 using multiplier 1404. The result of this multiplication undergoes an absolute value via block 1405 and is then filtered by digital low-pass filter 1406, such as a moving average (MA) or a single order infinite impulse response (IIR) filter. The output of the filter then undergoes a decision process via decision logic 1407 which generates the detection signal 1408. The decision logic may function, for example, by comparing the result to a threshold 1420.

The principle of operation for a delay and correlate packet detector such as that of circuit 1400 is that it uses the periodicity property of the synchronization sequence to verify that the synchronization sequence is actually present at the input. Therefore, multiplying the conjugated signal with its delayed version (where the delay is equal to the synchronization signal period) should yield the absolute value of the signal, since ideally the signal and its delayed version are identical. Furthermore, a linear channel does not change the period of the signal (i.e. its frequency) but only its shape (i.e. the signal undergoes scaling, phase shifts, etc.) and therefore this detector is very robust to channel effects. This scheme is also advantageous due to its resilience to carrier frequency offset. The latter effect causes the delayed signal samples 1410 and the incoming signal samples to have a constant phase difference between them. This constant phase difference is reflected in the input to magnitude block 1405 and is thereby eliminated.

The major drawback of this detector is when white Gaussian noise (AWGN) is added to the signal (which is the case in real world channels). In the case of AWGN added to the signal, the noise samples of the incoming signal and its delayed version are uncorrelated. This causes the noise to be multiplied via multiplier 1404. Although multiplication of uncorrelated noise may be tolerable for high signal to noise ratios (SNRs), it is detrimental for signals with low SNRs where the performance of this detector quickly deteriorates.

It is thus desirable to have a packet detection mechanism that does not suffer from the disadvantages of the prior art cross correlation and delay and correlate based packet detectors. The mechanism should provide packet detection and carrier frequency offset estimation capabilities that are robust to operation in linear channels as well as to transmission signals having low SNRs.

SUMMARY OF THE INVENTION

The present invention is a novel and useful apparatus for and method of packet detection and carrier frequency offset estimation (referred to as the packet detection mechanism hereinafter) that overcomes the disadvantages of prior art detectors. The packet detection mechanism is robust to channels and sustains reasonable miss detection (and false alarm) rates at low SNR values. The mechanism of the invention achieves this through the use of a modified combined cross correlation and delay and correlate scheme. The combination of these two techniques combines the best of both by applying partial integration to overcome low SNR conditions and by calculating correlation factors to gain noise immunity.

A delay and correlate approach is used in order to handle the effects of multipath while swapping integration and multiplication to increase cross-correlation factors resulting in improved sensitivity in low SNR conditions. Further, correlation is divided into multiple chains to generate a plurality of partial correlations to observe short patterns in the spread sequence resulting in improved performance in long multipath channels.

Although the packet detection mechanism of the present invention can be incorporated in numerous types of wireless or wired communication devices such a multimedia player, cellular phone, PDA, DSL modem, WPAN device, etc., it is described in the context of a MBOA-UWB (i.e. WiMedia standard) based communication device. It is not intended, however, that the invention will be limited to the example applications and embodiments presented. It is appreciated that one skilled in the art can apply the principles of the present invention to many other types of communication systems well-known in the art without departing from the spirit and scope of the invention. In addition, the principles of the invention can be applied to other wireless or wired standards and is applicable wherever there is a need to perform packet detection over multipath plagued channels.

Advantages of the packet detection mechanism include (1) ability to achieve robust performance in low SNR conditions while maintaining immunity to severe multipath channels; (2) robustness to multipath channels; (3) robustness to carrier frequency offsets (CFOs); (4) ability to achieve robust packet detection from a single symbol over the air interface; (5) detection is independent of the spreading sequence used; (6) small chip area requirements; and (7) low power requirements.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, a method of packet detection for use in a digital receiver, the method comprising the steps of delaying an input sample stream through a plurality of delay elements, cross correlating the plurality of delayed input samples with reference signal samples, summing results of the cross correlation to yield a cross correlation sum thereby, performing a delay and correlate operation on the cross correlation sum by multiplying the cross correlation signal with its conjugated delayed version to generate a delay and correlate result thereby and generating an active detection signal if the delay and correlate result is greater than a threshold.

There is also provided in accordance with the invention, a method of packet detection for use in a digital receiver, the method comprising the steps of delaying an input sample stream through a plurality of delay elements, calculating a plurality of partial correlations of the plurality of delayed input samples with a reference signal samples, calculating an energy branch signal from the input sample stream and performing nonlinear detection as a function of the plurality of partial correlations and the energy branch signal to generate a detection signal therefrom.

There is further provided in accordance with the invention, a method of packet detection for use in a digital receiver, the method comprising the steps of delaying an input sample stream through a plurality of delay elements to generate a plurality of delayed signal samples thereby, multiplying the first plurality of delayed signal samples with reference signal samples to generate a first plurality of products thereby, summing the plurality of products to yield a plurality of summed values thereby, multiplying pairs of the summed values together to generate a second plurality of products, whereby one sum is multiplied by the conjugate of another sum, calculating an energy branch signal from the input sample stream and performing nonlinear detection as a function of the second plurality of products and the energy branch signal to generate a detection signal therefrom.

There is also provided in accordance with the invention, a method of packet detection for use in a digital receiver, the method comprising the steps of delaying an input sample stream through a plurality of delay elements to generate a plurality of delayed signal samples thereby, multiplying the plurality of delayed signal samples with reference signal samples to generate a first plurality of products thereby, summing the first plurality of products to yield a plurality of summed values thereby, multiplying pairs of the summed values together to generate a second plurality of products, whereby one sum is multiplied by the conjugate of another sum and summing the second plurality of products to generate a sum output thereby and detecting an angle of the sum output to generate a carrier frequency offset estimate therefrom.

There is further provided in accordance with the invention, a mobile communications device comprising a UWB transceiver and associated WiMedia media access control (MAC), the UWB transceiver comprising packet detection means for detecting the presence of UWB packets, the patent detection means comprising means for delaying an input sample stream through a plurality of delay elements, means for cross correlating the plurality of delayed input samples with reference signal samples, means for summing results the cross correlation to yield a cross correlation sum thereby, means for performing a delay and correlate operation on the cross correlation sum to generate a delay and correlation result thereby, means for generating an active detection signal if the delay and correlation result is greater than a threshold and a processor operative to send and receive data to and from the UWB transceiver.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|------|------------|
| AC | Alternating Current |
| ADC | Analog to Digital Converter |
| ASIC | Application Specific Integrated Circuit |
| AVI | Audio Video Interleave |
| AWGN | Additive White Gaussian Noise |
| BMP | Windows Bitmap |
| BPSK | Binary Phase Shift Keying |
| CFO | Carrier Frequency Offset |
| CPU | Central Processing Unit |
| DC | Direct Current |
| DSL | Digital Subscriber Line |
| DSP | Digital Signal Processor |
| EPROM | Erasable Programmable Read Only Memory |
| FFT | Fast Fourier Transform |
| FM | Frequency Modulation |
| FPGA | Field Programmable Gate Array |
| GPS | Global Positioning System |
| HDL | Hardware Description Language |
| IC | Integrated Circuit |
| IEEE | Institute of Electrical and Electronics Engineers |
| IF | Intermediate Frequency |
| IFFT | Inverse Fast Fourier Transform |
| IIR | Infinite Impulse Response |
| JPG | Joint Photographic Experts Group |
| LAN | Local Area Network |
| LO | Local Oscillator |
| MA | Moving Average |
| MAC | Media Access Control |
| MBOA | Multiband OFDM Alliance |
| MP3 | MPEG-1 Audio Layer 3 |
| MPG | Moving Picture Experts Group |
| OFDM | Orthogonal Frequency Division Multiplexing |
| PC | Personal Computer |
| PDA | Portable Digital Assistant |
| QAM | Quadrature Amplitude Modulation |
| QPSK | Quadrature Phase Shift Keying |
| RAM | Random Access Memory |
| RF | Radio Frequency |
| ROM | Read Only Memory |
| SIM | Subscriber Identity Module |
| SNR | Signal to Noise Ratio |
| TV | Television |
| USB | Universal Serial Bus |
| UWB | Ultra Wideband |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMV | Windows Media Video |
| WPAN | Wireless Personal Area Network |

DETAILED DESCRIPTION OF THE INVENTION

The present invention is a novel and useful apparatus for and method of packet detection and carrier frequency offset estimation (referred to as the packet detection mechanism hereinafter) that overcomes the disadvantages of prior art detectors. The packet detection mechanism is robust to channels and sustains reasonable miss-detection (and false alarm) rates at low SNR values. The mechanism of the invention achieves this through the use of a modified combined cross correlation and delay and correlate scheme. The combination of these two techniques combines the best of both by applying partial integration to overcome low SNR conditions and by calculating correlation factors to gain noise immunity.

A delay and correlate approach is used in order to handle the effects of multipath and CFO while swapping integration and multiplication to increase cross-correlation factors resulting in improved sensitivity in low SNR conditions. Further, correlation is divided into multiple chains to generate a plurality of partial correlations to observe short patterns in the spread sequence resulting in improved performance in long multipath channels.

Although the packet detection mechanism of the present invention can be incorporated in numerous types of wireless or wired communication devices such a multimedia player, cellular phone, PDA, DSL modem, WPAN device, etc., it is described in the context of a MBOA-UWB (i.e. WiMedia standard) based communication device. It is not intended, however, that the invention will be limited to the example applications and embodiments presented. It is appreciated that one skilled in the art can apply the principles of the present invention to many other types of communication systems well-known in the art without departing from the spirit and scope of the invention. In addition, the principles of the invention can be applied to other wireless or wired standards and is applicable wherever there is a need to perform packet detection over multipath plagued channels.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA System

Figure 5:
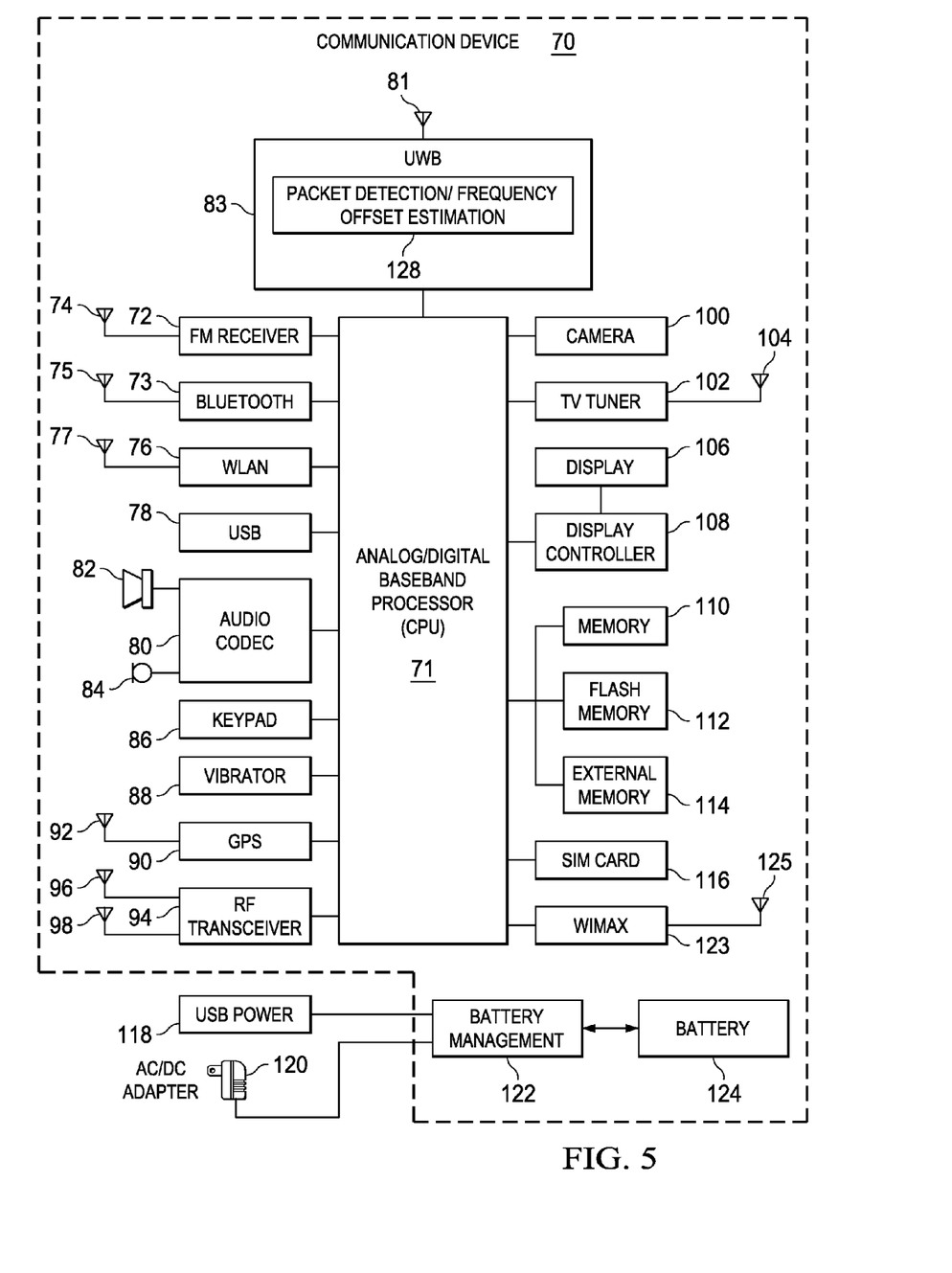
FIG. 5 is a simplified block diagram illustrating an example communication device incorporating the packet detection mechanism of the present invention.

A block diagram illustrating an example communication device in more detail incorporating the packet detection mechanism of the present invention is shown in FIG. 5. The communication device may comprise any suitable wired or wireless device such as a multimedia player, mobile device, cellular phone, PDA, wireless personal area network (WPAN) device, Bluetooth device, etc. For illustration purposes only, the communication device is shown as a cellular phone or smart phone. Note that this example is not intended to limit the scope of the invention as the packet detection mechanism of the present invention can be implemented in a wide variety of wireless and wired communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver and associated antenna 92.

A USB interface connection 78 provides a serial link to a user's PC or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. A Bluetooth radio and interface 73 and antenna 75 provide Bluetooth wireless connectivity when within the range of a Bluetooth wireless network. Further, the communication device 70 may also comprise a WiMAX radio and interface 123 and antenna 125. SIM card 116 provides the interface to a user's SIM card for storing user data such as address book entries, etc.

The communication device 70 also comprises an Ultra Wideband (UWB) radio and interface 83 and antenna 81. The UWB radio typically comprises an MBOA-UWB based radio adapted to implement the packet detection mechanism of the present invention as described in more detail infra. In operation, the packet detection block 128 may be implemented as hardware, software executed as a task on the baseband processor 71 or a combination of hardware and software. Implemented as a software task, the program code operative to implement the packet detection mechanism of the present invention is stored in one or more memories 110, 112 or 114.

Portable power is provided by the battery 124 coupled to battery management circuitry 122. External power is provided via USB power 118 or an AC/DC adapter 120 connected to the battery management circuitry which is operative to manage the charging and discharging of the battery 124.

General Packet Detection Mechanism

Figure 6:
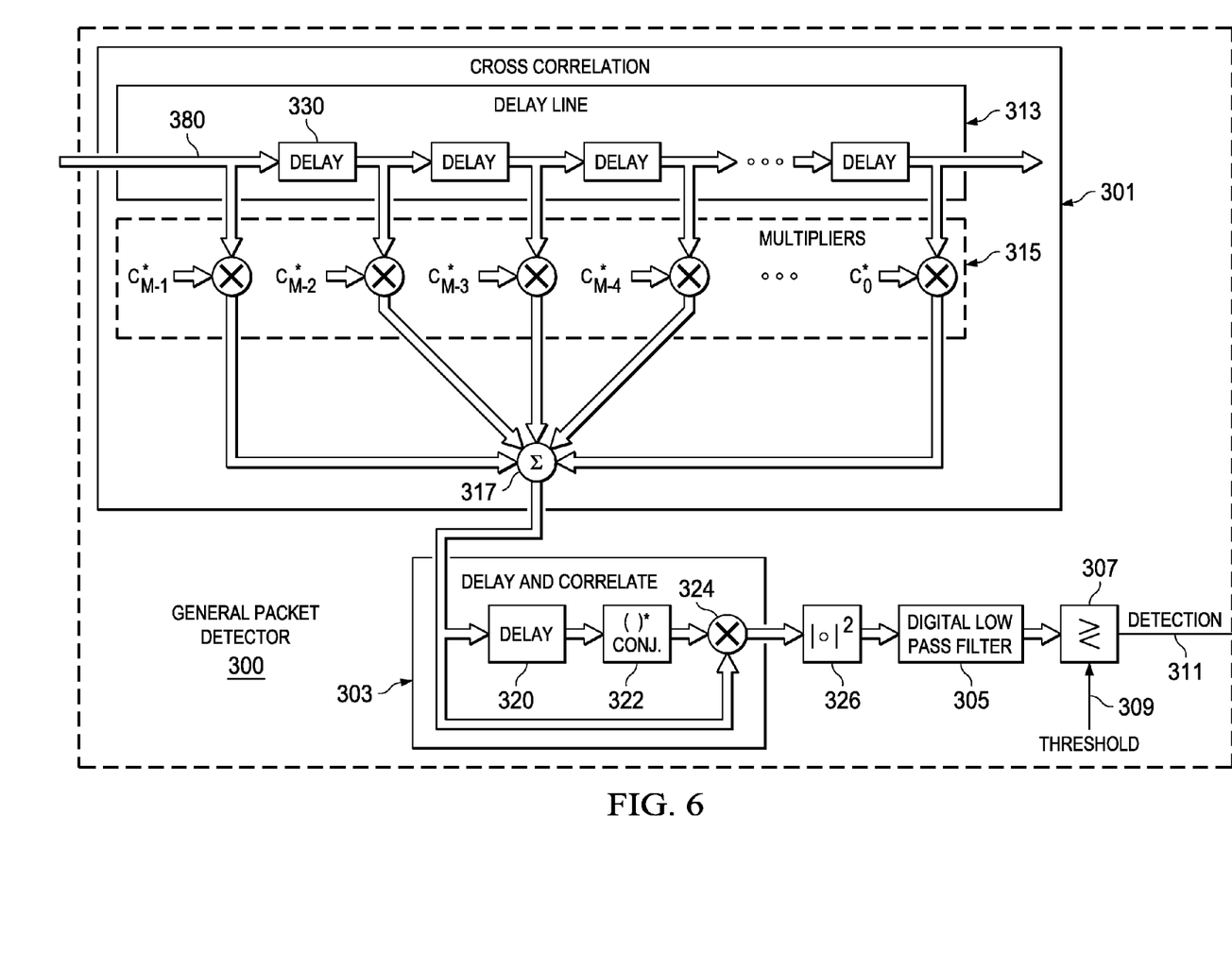
FIG. 6 is a high level block diagram illustrating an example wireless communication device adapted to implement the packet detection mechanism of the present invention.

A high level generalized block diagram illustrating an example wireless communication device adapted to implement the packet detection mechanism of the present invention is shown in FIG. 6. The packet detector, generally referenced 300, comprises a cross correlation block 313, delay and correlator block 303, absolute value block 326, digital low pass filter 305 and decision logic 307. The cross correlator 301 comprises a delay line 313 comprising a plurality of delay elements 330, a plurality of multipliers 315 and summer 317. The delay and correlate block 303 comprises delay block 320 whose delay is equal to the reference signal periodicity, complex conjugate block 322 and multiplier 324.

In operation, the incoming signal 380 undergoes a partial cross correlation operation using cross correlator 301. Multipliers 315 are operative to multiply the delayed instances of the incoming signal with a certain subset of the flipped conjugated reference signal $c_{M-1}^*, c_{M-2}^*, \ldots, c_1^*, c_0^*$ (M≤K) where double arrows denote complex signals. The output of the correlation block 301 undergoes some type of delay-and-correlate equivalent operation via delay and correlate block 303. The signal output of the delay and correlate block then undergoes absolute squared value via block 326 and optional filtering via digital low pass filter 305. The result is then compared via decision logic 307 to a threshold 309. The decision logic may, for example, comprise a simple comparison circuit. If the input to block 307 is higher than the threshold 309, the detection signal 311 becomes active. Otherwise, the detection signal remains inactive.

The principal of operation of the packet detection mechanism of the invention is that the cross correlation procedure significantly improves the SNR of the incoming signal while maintaining its periodic properties. The delay and correlate procedure exploits that periodicity in order to generate an accurate output detection signal. Thus, the packet detector is both robust to signals having low SNRs (as the cross correlation of FIG. 3) as well as to linear channels (as the delay and correlate scheme of FIG. 4).

Packet Detection Mechanism—Embodiment #1

Figure 7:
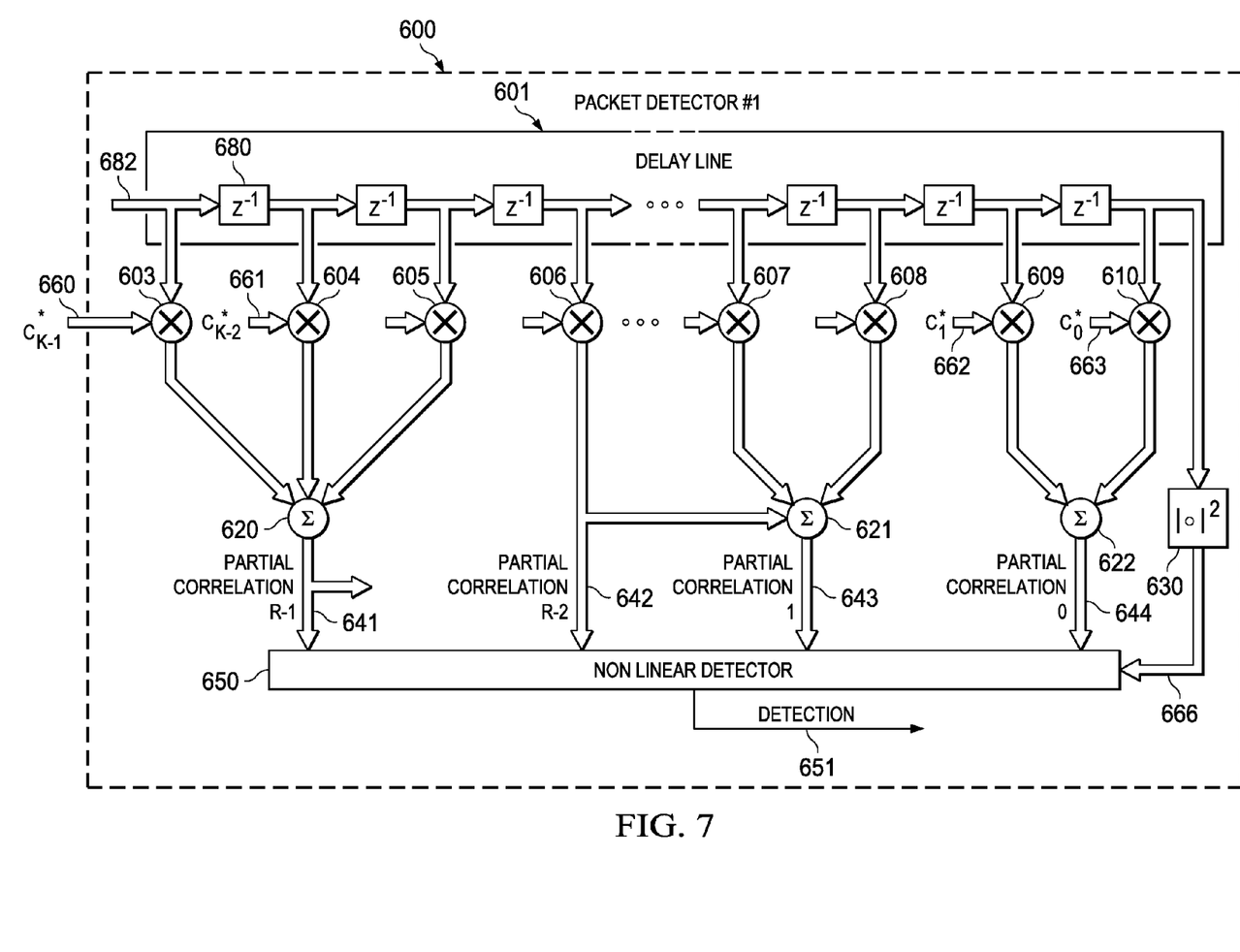
FIG. 7 is a block diagram illustrating a first example embodiment of the packet detection mechanism of the present invention.

A block diagram illustrating a first example embodiment of the packet detection mechanism of the present invention is shown in FIG. 7. The packet detector, generally referenced 600, comprises delay line 601 comprising a plurality of delay elements 680, a plurality of multipliers 603, 604, 605, 606, 610, a plurality of summers 620, 621, 622, square magnitude block 630 and nonlinear detector circuit 650.

In operation, the input signal sample stream 682 is delayed using delay line circuitry 601 comprising a plurality of delay elements 680. The delay elements comprise single sample delays. The delayed samples are multiplied using a plurality of multipliers 603, 604, 605, 606, 610 with the flipped conjugated reference signal samples $c_{K-1}^*, c_{K-2}^*, \ldots, c_1^*, c_0^*$ 660, 661, 662, 663, respectively. These signals are then summed by a plurality of summers 620, 621, 622 to create a plurality of partial correlations 641, 642, 643, 644 (i.e. a total of R such partial correlations).

In accordance with the invention, the partial correlations may comprise the sum of any number of multiplied delayed samples. The partial correlation combinations including the number of partial correlation combinations shown in FIG. 7 are provided for example purposes only and do not necessarily constitute an optimal or best combination. It is appreciated that one skilled in the art may apply the partial correlation technique of the present invention and choose the best combination to suit numerous other applications and standards.

The output from (or input signal to) the delay line 601 is also input to square magnitude block 630. The output of this block and R partial correlations 641, 642, 643, 644 are input to a nonlinear detector 650 which functions to provide an accurate detection indication 651. An example of such a nonlinear detector may comprise a pair-wise multiplication of all or a portion of the partial correlations thus implementing a delay and correlate mechanism. A nonlinear detector may also contain digital low pass filter post processing (i.e. after processing by the nonlinear elements) which functions to smooth the time dependent phenomena associated with signal transients and noise.

Figure 8:
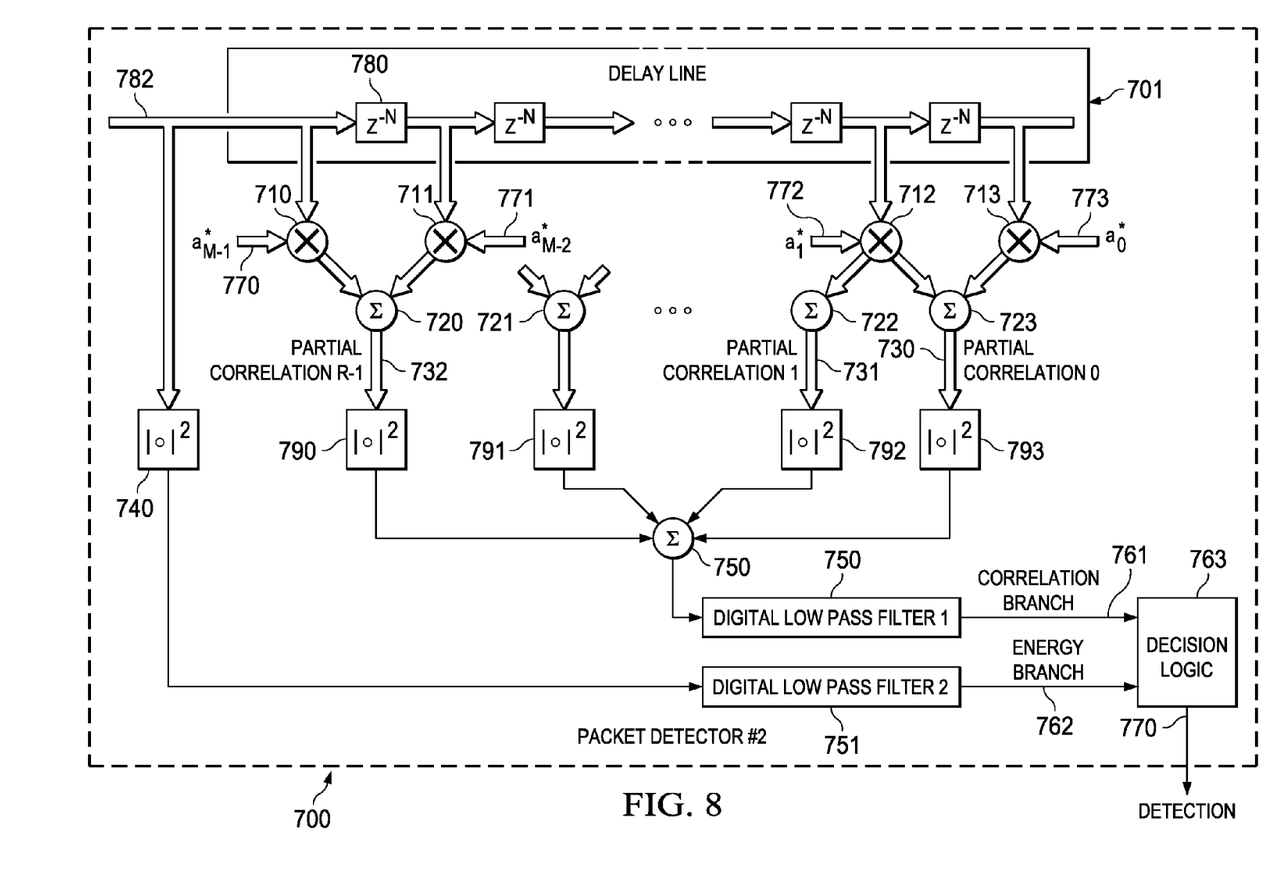
FIG. 8 is a block diagram illustrating a second example embodiment of the packet detection mechanism of the present invention.
Figure 9:
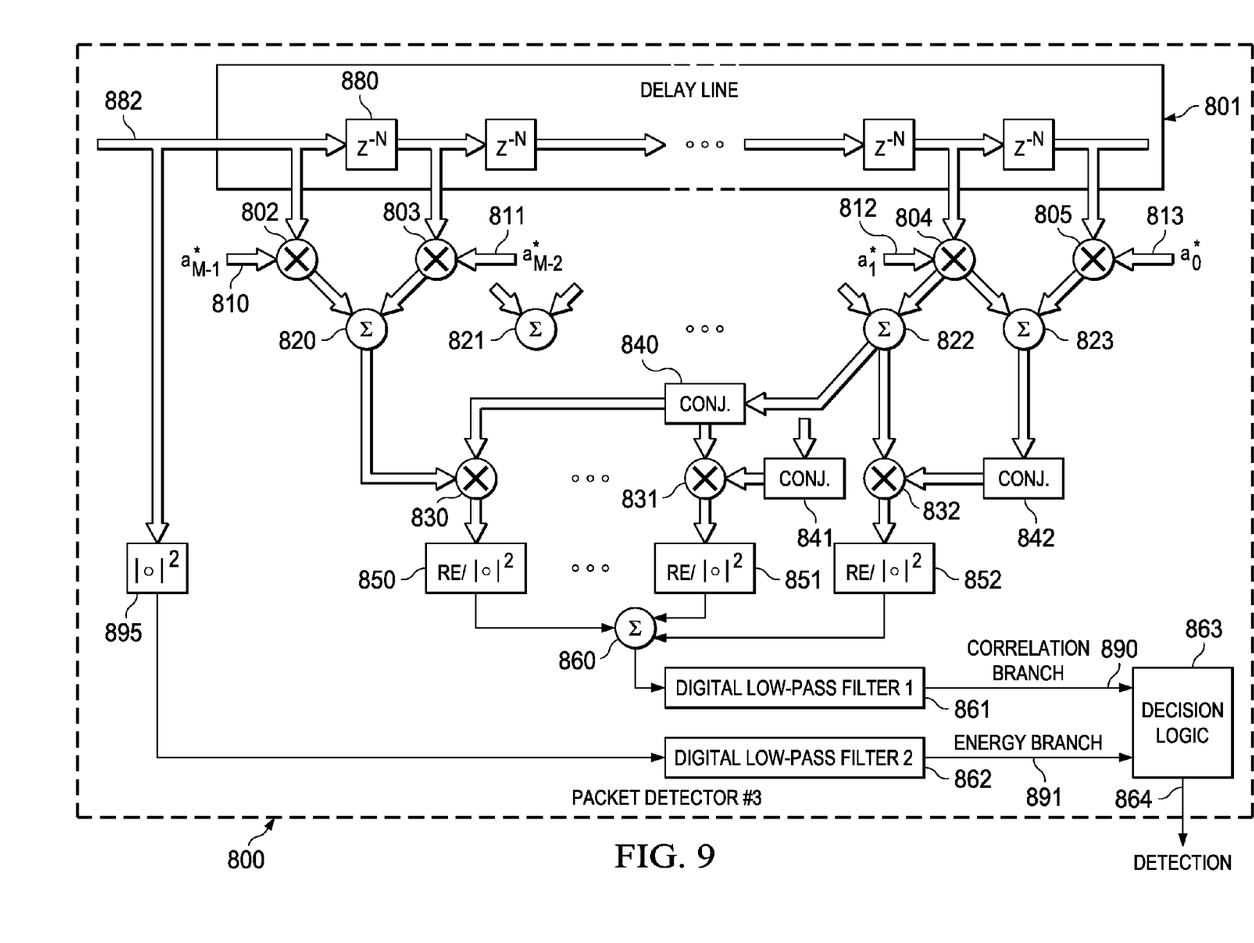
FIG. 9 is a block diagram illustrating a third example embodiment of the packet detection mechanism of the present invention.
Figure 10:
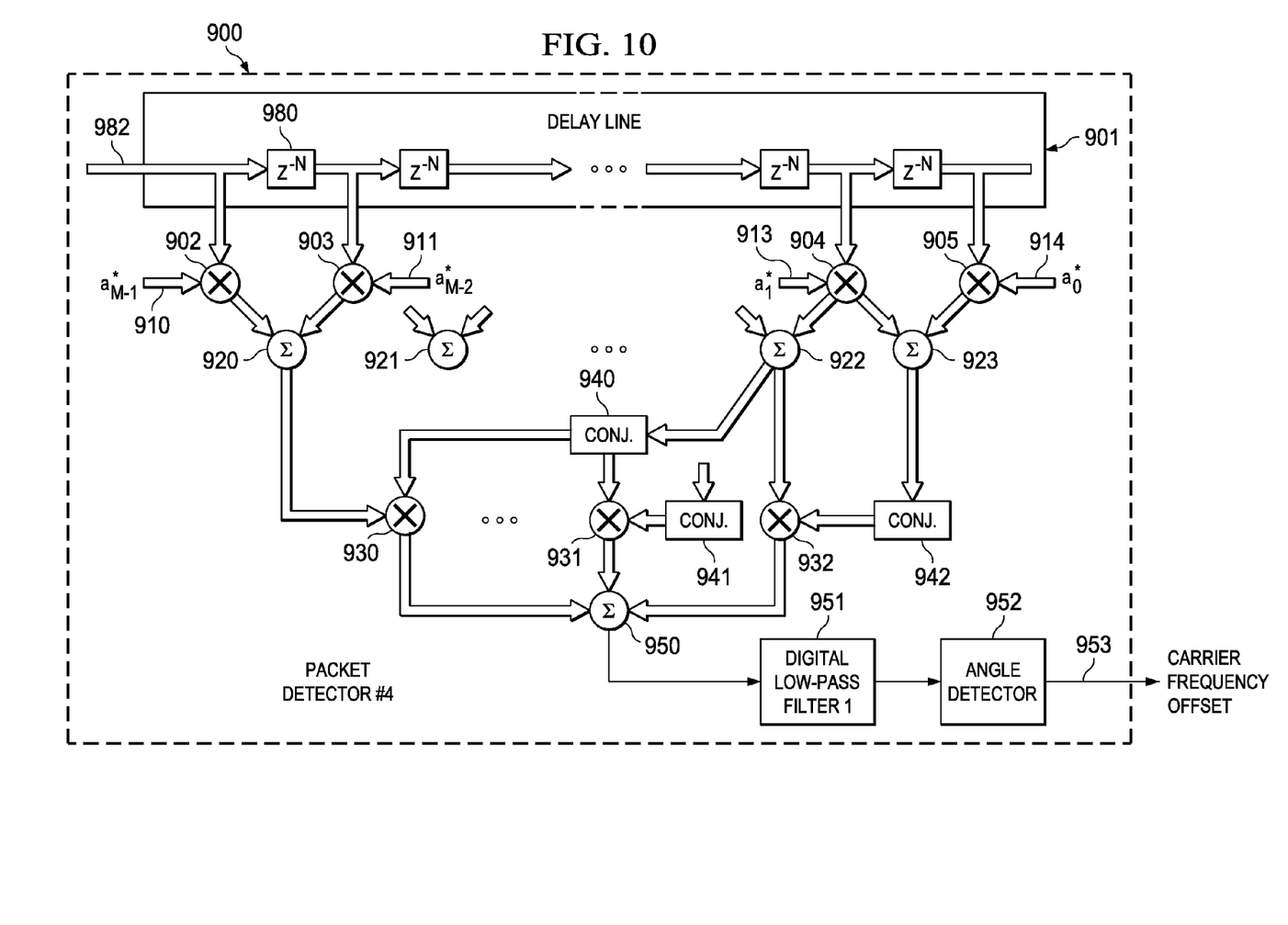
FIG. 10 is a block diagram illustrating a carrier frequency offset estimation circuit using the third embodiment of the packet detection mechanism of the present invention.

As described hereinabove, the partial correlations generated may comprise the sum of any number of multiplied delayed samples. The motivation behind selecting the appropriate sets of multiplied delayed samples to be added together into each partial correlation sum for the schemes shown in FIG. 7 and also in FIGS. 8, 9 and 10 is to sum up samples that have the same expected value independently of the channel distortion. As an example of such a set, consider the samples in the transmitted sequence positioned therein each $a_m b_0 \ldots a_m b_{N-1}$ group at the same delay from the beginning of the group. Such samples are expected to be similarly distorted by the previous samples in the group. Thus, they are expected to keep their similarity (up to $a_m$ multiplication) in the face of channel distortion conditions.

Packet Detection Mechanism—Embodiment #2

A block diagram illustrating a second example embodiment of the packet detection mechanism of the present invention is shown in FIG. 8. The packet detector, generally referenced 700, comprises delay line 701 comprising a plurality of delay elements 780, a plurality of multipliers 710, 711, 712, 713, a plurality of summers 720, 721, 722, 723, a plurality of square magnitude blocks 740, 790, 791, 793, digital low pass filter #1 750, digital low pass filter #2 751 and decision logic 763.

In operation, the input signal sample stream is delayed using delay line 701. Please note that in this second embodiment, the delay line atomic delay comprises N samples, where N is equal to the signal period. The delayed version of the signal samples are then multiplied by the flipped version of the spread sequence $a_{M-1}^*, a_{M-2}^*, \ldots a_1^*, a_0^*$ 1770, 1771, 1772, 1773, respectively. R partial correlation signals are then generated via summers 720, 721, 722, 723. Each partial correlation value undergoes a square magnitude operation via blocks 790, 791, 792, 793. The output of these square magnitude blocks are then summed together using summer 750. The signal then undergoes digital low pass filtering via block 750 in order to smooth out signal transients and noise effects. The output of the filtering stage is the correlation branch signal 761.

An energy branch signal 762 is generated by taking the input signal samples 782 and passing them through a square magnitude operation via block 740. The output signal then undergoes digital low pass filtering via digital low pass filter #2 751. Both the correlation branch signal 761 and the energy branch signal 762 are input to a decision logic circuit 763 which generates the reliable output detection signal 770 by appropriate comparison between the two. In this example embodiment, the nonlinear detector comprises summing together the square magnitudes of the R partial correlations.

Note that the partial correlations may comprise the sum of any number of multiplied delayed input samples. The partial correlation combinations and number thereof presented in FIG. 8 are shown for example purposes only and do not constitute an optimal or best combination. It is appreciated that one skilled in the art may apply the partial correlation technique of the present invention and choose the best combination to suit numerous other applications and standards.

Packet Detection Mechanism—Embodiment #3

A block diagram illustrating a third example embodiment of the packet detection mechanism of the present invention FIG. 9. The packet detector, generally referenced 800, comprises delay line 801 comprising a plurality of delay elements 880, a first plurality of multipliers 802, 803, 804, 805, a plurality of summers 820, 821, 822, 823, a second plurality of multipliers 830, 831, 832, a plurality of conjugate blocks 840, 841, 842, square magnitude block 810, a plurality of real/square magnitude blocks 850, 851, 852, summer 860, digital low pass filter #1 861, digital low pass filter #2 862 and decision logic 863.

In operation, the input signal sample stream undergoes a delay line 801, whose atomic delay is the reference signal period N. The delayed signal samples are multiplied using a plurality of multipliers 802, 803, 804, 805 with the conjugated flipped version of the delayed signal $a_{M-1}^*, a_{M-2}^*, \ldots a_1^*, a_0^*$ 810, 811, 812, 813, respectively. Various combinations of the delayed input signal samples multiplied by the reference samples are summed together via summers 820, 821, 822, 823. Pairs of the outputs of these summers are then multiplied by each other, whereby the output of one summer is multiplied with the conjugate of the output of another summer.

Conjugate signals are generated via blocks 840, 841, 842. Multiplication of the pairs are obtained using multipliers 830, 831, 832. The product outputs of the multipliers undergo either square magnitude value or the taking of their respective real parts using blocks 850, 851, 852. The results of this operation are then summed together via summing block 860. The sum output by summer 860 is digital low pass filtered in order to smooth out unwanted signal transients and noise effects to yield the correlation branch signal 890.

In parallel, the input (or output) of the delay line 801 undergoes square magnitude operation via block 895 and undergoes digital low pass filtering via digital low pass filter #2 862 to create the energy branch signal 891. The two signals are input to decision logic 863, which functions to generate a detection signal 864 based on the two input signals. One implementation of the decision logic compares the correlation branch signal to a threshold multiplied by the energy branch signal. If the latter is smaller than the correlation branch signal value the detection signal 864 becomes active.

Please note that the summed combinations and multiplied pairs shown in FIG. 9 are intended as an illustrious example and do not constitute an optimal or best combination. It is appreciated, however, that one skilled in the art may apply this technique and choose the best combination to suit numerous different applications and standards according to the actual reference sequence and parameters thereof (i.e. $a_n$, $b_n$, N and M).

It is important to note that in accordance with the invention, in this and the other embodiments described herein, each of the partial correlation sums functions to gather together a set of similar samples from a certain part of the sync sequence. The partial cross-correlation calculation achieved by this operation serves to improve the signal to noise ratio at the resulting partial correlation sum. Multiplication of two similar partial cross-correlations representing different parts of the sync sequence functions to provide the immunity to multipath channel distortion just as in the classical prior art delay and correlate technique.

Carrier Frequency Offset Estimation—Embodiment #4

A block diagram illustrating a carrier frequency offset estimation circuit using the third embodiment of the packet detection mechanism of the present invention is shown in FIG. 10. The packet detector, generally referenced 900, comprises delay line 901 comprising a plurality of delay elements 980, a first plurality of multipliers 902, 903, 904, 905, a plurality of summers 920, 921, 922, 923, a second plurality of multipliers 930, 931, 932, summer 950, digital low pass filter #1 951 and angle detector 952.

In operation, the input signal sample stream 982 undergoes a delay line 901, whose atomic delay is the reference signal period N. The delayed signal samples are multiplied using a plurality of multipliers 902, 903, 904, 905 with the conjugated flipped version of the delayed signal $a_{M-1}^*$, $a_{M-2}^*$, ... $a_1^*$, $a_0^*$ 910, 911, 912, 913, respectively. Various combinations of the delayed signal samples multiplied by the reference signal samples are summed together via summers 920, 921, 922, 923. Pairs of the outputs of these summers are then multiplied by each other, whereby the output of one summer is multiplied with the conjugate of the output of another summer.

Conjugate signals are generated via blocks 940, 941 and 942. Multiplication of the pairs are obtained using multipliers 930, 931, 932. The product outputs of the multipliers are summed together using summing circuit 950. The signal output of the summing circuit 950 is then digitally low pass filtered via block 951 in order to smooth out unwanted signal transients and noise effects. The output of this filter is a signal comprising a phasor whose angle is proportional to the carrier frequency offset. This angle is detected by angle detector 952. The output of the angle detector is the estimated carrier frequency offset 953.

Figure 11:
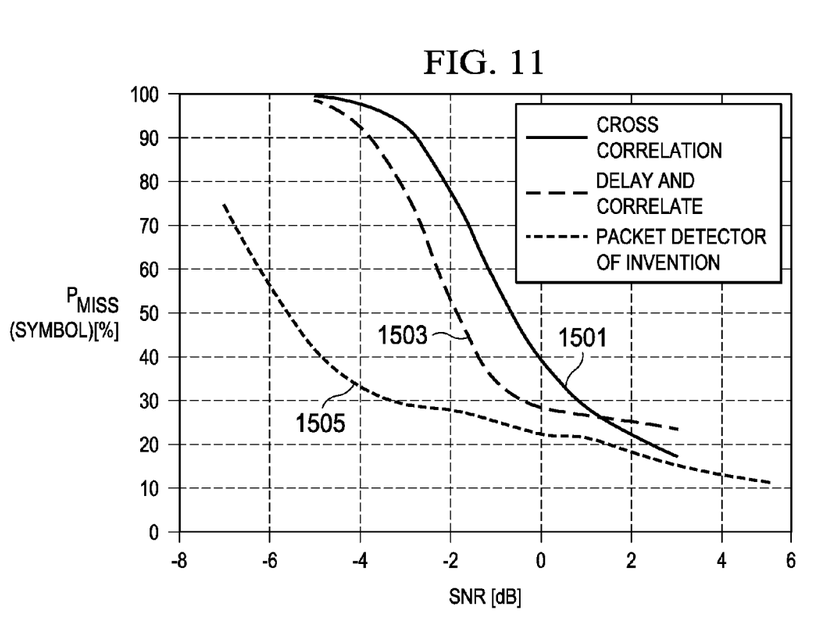
FIG. 11 is a graph of the simulated results of the present invention in the context of an example MBOA UWB system.

A graph illustrating the probabilities of miss-detection versus signal to noise ratio is shown in FIG. 11. Presented in the graph are curves representing the probability of miss-detection as a function of SNR for several algorithms on standard MBOA UWB channel model 2 for an outage probability of 10% (i.e. 90% of the channels statistically yield better results than these curves). Solid trace 1501 shows the results of the prior art cross correlation scheme of FIG. 3. Dashed trace 1503 shows the results of the prior art delay and correlate scheme of FIG. 4. Dotted trace 1505 shows results of the packet detection scheme of the present invention.

Note that all three traces 1501, 1503 and 1505 are shown at the same probability of false alarm. Note also that the probabilities of detection are shown per symbol and since the number of symbols in the OFDM-UWB preamble is six, the actual probabilities are $P_{miss\_packet} = P_{miss\_symbol}^6$. Hence, a reasonable target for the probability of miss detection per symbol is approximately 40% as it yields a 4% probability of miss detection per packet. Inspection of FIG. 11 reveals that use of the packet detector of the present invention yields significant improvements over the prior art. More specifically, the packet detector of the present invention yields an SNR improvement of approximately 3 dB over the prior art delay and correlate scheme and approximately 5 dB over the prior art cross correlation scheme.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of packet detection for use in a digital receiver, said method comprising the steps of:
   delaying an input sample stream through a plurality of delay elements;
   calculating a plurality of partial correlations of said plurality of delayed input samples with reference signal samples;
   calculating an energy branch signal from said input sample stream;
   performing nonlinear operations on said plurality of partial correlations to obtain a correlation branch signal; and
   operating decision logic on said energy branch and correlation branch signals to obtain a detection decision.

2. The method according to claim 1, wherein each said delay element comprises a single input sample delay.

3. The method according to claim 1, wherein each said delay element comprises an N sample delay wherein N denotes the signal period.

4. The method according to claim 1, wherein said energy branch signal is generated from the output of said plurality of delay elements.

5. The method according to claim 1, wherein said reference signal samples comprise flipped complex conjugated reference signal samples.

6. The method according to claim 1, wherein said step of performing nonlinear operations comprises digitally filtering the results of nonlinear processing of said partial correlations.

7. The method according to claim 1, wherein said step of performing nonlinear operations comprises the step of multiplication of a plurality of said partial correlations thereby effectively performing a delay and correlation operation.

8. The method according to claim 1, wherein said step of generating said energy branch signal comprises the step of applying a square magnitude operation to said input sample stream.

9. The method according to claim 1, wherein said step of calculating said plurality of partial correlations comprises summing a plurality of delayed input samples multiplied by corresponding reference signal samples.

10. The method according to claim 1, wherein said step of calculating a plurality of partial correlations comprises the step of summing samples having the same expected value independently of any channel distortion.

11. A method of packet detection for use in a digital receiver, said method comprising the steps of:
   delaying an input sample stream through a plurality of delay elements;
   calculating a plurality of partial correlations of said plurality of delayed input samples with reference signal samples;
   calculating an energy branch signal from said input sample stream;
   performing nonlinear operations on said plurality of partial correlations to obtain a correlation branch signal wherein said step of performing nonlinear operations comprises the steps of:
      generating a square magnitude of each of said partial correlations;
      summing said square magnitudes to generate a correlation branch signal therefrom;
      generating said detection decision as a function of said correlation branch signal and said energy branch signal and
   operating decision logic on said energy branch and correlation branch signals to obtain a detection decision.

12. A method of packet detection for use in a digital receiver, said method comprising the steps of:
   delaying an input sample stream through a plurality of delay elements to generate a plurality of delayed signal samples thereby;
   multiplying said first plurality of delayed signal samples with reference signal samples to generate a first plurality of products thereby;
   summing said plurality of products to yield a plurality of summed values thereby;
   multiplying pairs of said summed values together to generate a second plurality of products, whereby one sum is multiplied by the conjugate of another sum;
   calculating an energy branch signal from said input sample stream; and
   performing nonlinear detection as a function of said second plurality of products and said energy branch signal to obtain a detection decision.

13. The method according to claim 12, wherein each said delay element comprises an N sample delay wherein N denotes the reference signal period.

14. The method according to claim 12, wherein said reference signal samples comprise conjugated flipped versions of the delayed reference signal samples.

15. The method according to claim 12, wherein said step of generating said energy branch signal comprises the step of applying a square magnitude operation to said input sample stream.

16. The method according to claim 12, wherein said step of performing nonlinear detection comprises the steps of:
   generating a square magnitude of each of said second plurality of products;
   summing said square magnitudes to generate a correlation branch signal therefrom;
   generating said output detection signal as a function of said correlation branch signal and said energy branch signal.

17. The method according to claim 12, said step of performing nonlinear detection further comprises the step of digitally filtering said correlation branch signal and said energy branch signal before said step of generating said output detection signal.

18. The method according to claim 12, said step of performing nonlinear detection comprises the step of asserting said detection signal active if said energy branch signal multiplied by a threshold is less than said correlation branch signal.

19. The method according to claim 12, wherein said step of performing nonlinear detection comprises the steps of:
   taking the real part of each of said second plurality of products;
   summing said real parts to generate a correlation branch signal therefrom;
   generating said output detection signal as a function of said correlation branch signal and said energy branch signal.

20. The method according to claim 12, said step of performing nonlinear detection further comprises the step of digitally filtering said correlation branch signal and said energy branch signal before said step of generating said output detection signal.

21. The method according to claim 12, said step of performing nonlinear detection comprises the step of asserting said detection signal active if said energy branch signal multiplied by a threshold is less than said correlation branch signal.

* * * * *